United States Patent [19]
Stephens

[11] 3,728,379
[45] Apr. 17, 1973

[54] PROPOXYPHENE SALTS

[75] Inventor: Verlin C. Stephens, Indianapolis, Ind.

[73] Assignee: Eli Lilly and Company, Indianapolis, Ind.

[22] Filed: June 29, 1971

[21] Appl. No.: 158,126

[52] U.S. Cl. ............... 260/490, 260/326.3, 424/274, 424/311
[51] Int. Cl. ............................................ C07c 143/84
[58] Field of Search ..................................... 260/490

[56] References Cited

UNITED STATES PATENTS

| | | | |
|---|---|---|---|
| 2,728,779 | 12/1955 | Pohland | 260/490 |
| 3,065,261 | 11/1962 | Stephens | 260/490 |
| 3,395,146 | 7/1968 | Satzinger | 260/490 |

*Primary Examiner*—Vivian Garner
*Attorney*—Everet F. Smith et al.

[57] ABSTRACT

The $\alpha$-d and $\alpha$-l forms of the 4-chloro-m-toluene-sulfonate and 3,4-dichlorobenzenesulfonate salts of propoxyphene. These salts are suitable for formulation of these analgesic and antitussive compounds into aqueous suspensions having acceptable taste characteristics.

7 Claims, No Drawings

3,728,379

PROPOXYPHENE SALTS

BACKGROUND OF THE INVENTION

1. Field of the Invention

This invention relates to the 4-chloro-m-toluenesulfonate and the 3,4-dichlorobenzenesulfonate salts of the α-d- and α-l forms of propoxyphene (1,2-diphenyl-2-propionoxy-3-methyl-4-dimethylaminobutane). The α-d-isomer hereinafter is referred to as d-propoxyphene and the α-l-isomer as l-propoxyphene. The d-propoxyphene and l-propoxyphene salts of this invention are improved compounds useful as analgesics and antitussives, respectively.

2. Description of the Prior Art

Propoxyphene possesses two centers of asymmetry and therefore occurs in diastereoisomeric forms. The less soluble diastereoisomers are designated as the alpha isomers and the more soluble as the beta isomers. The present invention is concerned only with the alpha isomers, since it has been found that the beta isomers have little or no pharmaceutical activity. U.S. Pat. No. 2,728,779 discloses the preparation of the α-d,l-racemate as the free base and as certain acid addition salts thereof. The α-d,l-racemic mixture, although pharmacologically active, is resolved into the α-l compound which is an excellent antitussive and the α-d compound which is an analgesic of outstanding usefulness, having little or no tendency to produce addiction.

The base compounds have a characteristic, intensely bitter flavor which gives rise to problems in preparing formulations for use by oral administration. The flavor is a particularly severe problem in preparing formulations of the compounds for use in the form of suspensions. Because of their bitter taste, it is not practical to formulate the propoxyphene materials of U.S. Pat. No. 2,728,779 into pediatric suspensions.

U.S. Pat. No. 3,065,261 discloses the 2-naphthalenesulfonate salts of d- and l-propoxyphene as compounds having improved taste, good stability and very low solubility in water. These salts possess essentially the same pharmaceutical activity as the free base and the same substantial freedom from side effects.

The present invention involves the discovery of two new salts of d- and l-propoxyphene. These salts avoid the problem of the highly unpleasant taste of the parent compound while retaining the desired pharmacological activity. Furthermore, these compounds are significantly less soluble than the 2-naphthalene sulphonate salts described in U.S. Pat. No. 3,065,261. The salts of this invention, because of their markedly decreased taste intensity, can be prepared in the form of pediatric suspensions of excellent acceptability

SUMMARY OF THE INVENTION

The propoxyphene base employed in preparing the compositions of this invention has the following formula:

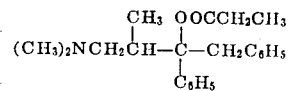

I

The d and l-propoxyphene 4-chloro-m-toluenesulfonate and 3,4-dichlorobenzenesulfonate salts are only slightly soluble in water, 0.72 mg/ml (at 33°C.) for the α-d- and α-l-4-chloro-m-toluenesulfonate and 0.38 mg/ml (at 25°C.) for the α-d and α-l-3,4-dichlorobenzenesulfonate. The rates of solution are very slow, 0.075 mg/ml after 1 hour for the d and l-propoxyphene -propoxyphene 4-chloro-m-toluenesulfonate salts, and 0.2 mg/ml after one hour for the 3,4-dichlorobenzenesulfonates. Such solubility characteristics provide a highly desirable sustained release of the analgesic and antitussive effect of these compounds. The salts of this invention also have a pleasant flavor of excellent acceptability when formulated into suspensions for oral administration. These taste properties are in marked contrast to the bitter taste of the free base and hydrochloride salts of α-d and αl-propoxyphene. Also, the salts of this invention have formulating characteristics which facilitate their combination into an oral dosage form with aspirin, having excellent taste properties and greater stability than the hydrochloride or 2-naphthalenesulfonate.

DETAILED DESCRIPTION OF THE INVENTION

The novel salts of this invention are readily prepared by reacting the propoxyphene base compound as the hydrohalide or other strong acid salt at elevated temperatures in an inert mutual solvent with a salt of 4-chloro-m-toluenesulfonic acid or 3,4-dichlorobenzenesulfonic acid, followed by cooling of the reaction mixture to crystallize the desired propoxyphene alt. The sodium, potassium, calcium, or other soluble alkali metal or alkaline earth metal salt of the acid can suitably be employed. The solvent can be aqueous ethanol, methanol or other inert mutual solvent. Preferably the solvent is an aquous solution of a water-miscible alcohol containing from about 25 to 50 percent by volume of the alcohol. Since the solubility characteristics of the reactants are well known other solvents can be ascertained readily. The desired solid reaction product can be separated from the liquid phase, leaving the by-product salt resulting from the reaction (e.g. sodium chloride) behind in the liquid phase when an aqueous solvent is utilized. After separation, the solid reaction product is washed with water to remove any occluded by-product salt, and then is re-crystallized, if desired, from aqueous alcohol.

Other techniques can be employed in preparing the novel salts of this invention, for example, by dissolving the base compound and a slight molar excess of the 4-chloro-m-toluenesulfonic acid or 3,4-dichlorobenzenesulfonic acid in an inert mutual solvent at elevated temperatures and thereafter filtering to remove any undissolved material, followed by cooling, whereupon the desired salts of the base compound crystallize in good yield. Separation of the salts of the base compound can be by filtration or the like.

In a further alternative procedure, the base compound in the form of a strong acid salt can be reacted in aqueous solution with the 4-chloro-m-toluenesulfonic acid or 3,4-dichlorobenzene-sulfonic acid itself, and the desired corresponding salt of the base compound precipitated therefrom.

The product compounds of the present invention are readily prepared in an aqueous suspension suitable for pediatric and general use by homogenizing with an aqueous vehicle of conventional type containing a suspending agent, a sweetening agent, and a flavoring material.

A preferred embodiment of this invention comprises such aqueous suspensions having incorporated therein a pharmaceutically acceptable 4-chloro-m-toluenesulfonate salt or 3,4-dichlorobenzene-sulfonate salt, e.g. a sodium or other alkali metal or alkaline earth metal sulfonate, to minimize the taste of the medicament. Taste improvement is observed even with very low proportions of such added salts, and the effect is increased at proportions up to the saturation level. It is generally preferred to add the salt in a proportion between about one and about three percent by weight of the total suspension.

In the preparation of the new compounds and of the suspensions thereof, it is of course important to employ a grade of 4-chloro-m-toluenesulfonic acid and 3,4-dichlorobenzenesulfonic acid or its salts having essentially no pharmaceutically objectionable impurities, and particularly having no impurities with objectionable taste properties.

The preparation of the racemic propoxyphene and resolution thereof into its dextro and levo forms are well known, for example see U.S. Pat. Nos. 2,728,779 and 3,065,261, and *J. Am. Chem. Soc.*, 77, 3400 (1955) and *J. Am. Chem. Soc.*, 75, 4458 (1953).

The base compounds set forth in these patents are repre-sented by the following formula:

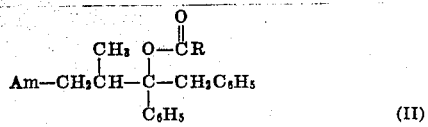

(II)

wherein R is methyl or ethyl and Am is dimethylamino, or pyrrolidino. This formula includes propoxyphene and closely related derivatives, the α-d and α-l isomers of which, like propoxyphene, exhibit analgesic and antitussive activity. The 4 -chloro-m-toluenesulfonate and 3,4-dichlorobenzenesulfonate salts of the compounds represented by (II) therefore form an embodiment of this invention.

The following examples more specifically illustrate this invention.

EXAMPLE 1

Purified sodium 4-chloro-m-toluenesulfonate (2.28 gm, 0.01 mole) is dissolved in 20 cc of water. To 30 cc of water is added l-propoxyphene hydrochloride (3.75 gm., 0.01 mole) with heating until all solids are dissolved. These solutions are then combined and form a heavy crystalline precipitate, which dissolves upon the addition of 50 cc methanol and heating. This solution is filtered hot to remove any undissolved material. The filtrate is diluted with distilled water to about 200 cc and allowed to stand. Large shiny platelets separate by crystallization and are filtered off; weight 4.7 gm. The product obtained in this way assays 57.2% propoxyphene base, 3.16% $H_2O$, and has a solubility in water of 0.72 mg/ml at 33°C. The rate of solution is very slow, only about 0.075 mg/ml at 1 hour.

EXAMPLE 2

α-d-Propoxyphene hydrochloride is converted into the 4-chloro-m-toluenesulfonate salt derivative according to the procedure of Example 1. The product is a white crystallne material having the same melting point and solubility as the α-l isomer.

The following example shows that the sulfonate salt need not be purified. In this example sodium 4-chloro-m-toluenesulfonate tailings are employed in the preparation of the d-propoxyphene salt.

EXAMPLE 3

Sodium 4-chloro-m-toluenesulfonate (114 gm.) in 500 cc water is boiled, filtered, cooled and recrystallized. The recrystallized material contains the purified sodium salt. The filtrate contains impure, sodium 4-chloro-m-toluenesulfonate. To this filtrate is added 15 gm. of d-propoxyphene hydrochloride in 200 cc ethanol. The precipitate immediately formed is collected and washed with water, and dried in a vacuum oven. d-Propoxyphene 4-chloro-m-toluenesulfonate (20 gm) having a melting point of 126°–132°C. is obtained. This product is recrystallized from an ethanol-water mixture (ethanol 100 cc, water 150 cc) and cooled over-night. The solids thus formed are filtered and washed with water followed by drying in air, using a heat lamp, to obtain 17.8 gm. of the 4-chloro-m-toluenesulfonate salt of d-propoxyphene having a melting point of 125°–133°C. and a solubility of 0.72 mg/ml in water at 33°C. The product assays 59.1% propoxyphene base, 3.11% $H_2O$. The taste of this product is not significantly different from that obtained using purified sodium 4-chloro-m-toluenesulfonate.

EXAMPLE 4

α-d-Propoxyphene hydrochloride is converted to the 3,4-dichlorobenzenesulfonate salt according to the procedure of Example 1, except that an equimolar amount of sodium 3,4-dichlorobenzene-sulfonate is substituted for the toluene sulfonate. The product is a white crystalline material (large shiny platelets) melting at 120°–130°C. and having a solubility of 0.38 mg/ml (at 25°C.). Assay 57.9% propoxyphene, 3.3% water.

EXAMPLE 5

α-l-Propoxyphene 3,4-dichlorobenzenesulfonate is prepared from α-l-propoxyphene hydrochloride, as in Example 4. The product is a shiny white crystalline material having the same melting point and solubility as the α-d-isomer.

The hydrochloride salts of the base compound of formula II above can be converted into the corresponding sulfonate salts by reacting 1 mole of sodium 4-chloro-m-toluenesulfonate or 1 mole of the selected base compound according to the procedure of Example 1 to produce the following new compounds:

α-l-1,2-diphenyl-2-propionoxy-3-methyl-4-dimethylaminobutane 4-chloro-m-toluenesulfonate, α-d-1,2-diphenyl-2-propionoxy-3-methyl-4-dimethylaminobutane 4-chloro-m-toluenesulfonate, α-l-1,2-diphenyl-2-acetoxy-3-methyl-4-dimethylaminobutane 4-chloro-m-toluenesulfonate, α-d-1,2-diphenyl-2-propionoxy-3-methyl-4-pyrrolidinobutane 4-chloro-m-toluenesulfonate, α-l-1,2-diphenyl-2-propionoxy-3-methyl-4-dimethylaminobutane 3,4-dichlorobenzenesulfonate, α-d-1,2-diphenyl-2-propionoxy-3-methyl-4-dimethylaminobutane 3,4-dichlorobenzenesulfonate, α-l-1,2-diphenyl-2-acetoxy-3-methyl-4-dimethylaminobutane 3,4-dichlorobenzenesulfonate, α-d-1,2-diphenyl-2-propionoxy-3-methyl-4-pyrrolidinobutane 3,4-dichlorobenzenesulfonate, and the like.

EXAMPLE 6

An analgesic aqueous suspension containing 20 mg/ml of α-d-propoxyphene 4-chloro-m-toluenesulfonate is prepared according to the following procedre. The suspension has the following composition:

Part I

| | |
|---|---|
| Sodium 4-chloro-m-toluenesulfonic acid | 20.0 g. |
| Citric acid | 4.25 g. |
| Saccharin, soluble | 5.0 g. |
| Water, distilled | 450 ml. |

Part II

| | |
|---|---|
| Methyl cellulose, 1500 cp. at 2% | 5.0 g. |
| Methyl cellulose, 4000 cp. at 2% | 1.0 g. |

Part III

| | |
|---|---|
| Sucrose | 600.0 g. |

Part IV

| | |
|---|---|
| Glucose | 100 g. |

Part V

| | |
|---|---|
| α-d-propoxyphene 4-chloro-m-toluenesulfonate | 20.3 g. |

Part VI

| | |
|---|---|
| Silicone emulsion, 30 percent | 3.3 g. |
| Water, distilled | 10 ml. |

Part VII

| | |
|---|---|
| F.D. and C. Red No. 2 | 0.05 g. |
| F.D. and C. Yellow No. 6 | 0.01 g. |
| Water, distilled | 10 ml. |

Part VIII

| | |
|---|---|
| Cherry flavor, imitation | 2.0 ml. |
| Cherry pit flavor, imitation | 0.5 ml. |

Part IX

| | |
|---|---|
| Ethanol, 95 percent | 10.5 ml. |
| Methyl parahydroxybenzoate | 0.3 g. |
| Propyl parahydroxybenzoate | 0.15 g. |
| Butyl parahydroxybenzoate | 0.15 g. |
| Oil of peppermint | 0.01 ml. |

Part X

| | |
|---|---|
| Water, distilled q.s. to 1000.0 ml. | |

Part I is mixed, dissolved, and heated to 90°C. Part II is added and mixed well with the solution, and the mixture is stirred while cooling to 30°C. to effect complete solution. Parts III and IV are successively added and dissolved. Part V is added in the form of a finely divided powder and mixed well for 10 minutes. Parts VI, VII, VIII, and IX are successively added and mixed well, after which distilled water (Part X) is added in a quantity sufficient to adjust the volume to 1,000 ml. The final mixture is homogenized.

The complete product has a pleasant cherry flavor of excellent acceptability in taste-panel tests.

EXAMPLE 7

An antitussive aqueous suspension containing 17.5 mg/ml of α-l-propoxyphene 4-chloro-m-toluenesulfonate is prepared using the proportions and procedures of Example 6 with the following modifications:

Part V

| | |
|---|---|
| α-l-propoxyphene 4-chloro-m-toluenesulfonate | 17.5 g. |

Part VII

| | |
|---|---|
| F.D. and C. Yellow No. 5 | 0.1 g. |
| Water, distilled | 10 ml. |

Parts VII and IX

| | |
|---|---|
| Ethanol, 95 percent | 10.5 ml. |
| Methyl parahydroxybenzoate | 0.3 g. |
| Propyl parahydroxybenzoate | 0.15 g. |
| Butyl parahydroxybenzoate | 0.15 g. |
| Lemon-lime flavor, imitation | 0.3 ml. |

The completed suspension has a pleasant citrus flavor of excellent acceptability in taste-panel tests.

The toxicity of the α-d and α-l propoxyphene 4-chloro-m-toluenesulfonate and 3,4-dichlorobenzenesulfonate salts of this invention is determined by orally dosing fasted mice. After 7 days observation, the $LD_{50}$ (dose at which half the mice tested died) of these novel salts, in each case, is greater than 1,000 mg/kg. Determined by the same method, the toxicity of d-propoxyphene 2-naphthalenesulfonate lfonate is $LD_{50}=765\pm126$ mg/kg.

I claim:

1. The 4-chloro-m-toluenesulfonate or 3,4-dichlorobenzenesulfonate salts of the α-d and α-l forms of a base represented by the formula

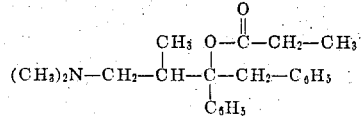

2. The 4-chloro-m-toluenesulfonate salts of the α-d and α-l forms of the base of claim 1.

3. The 4-chloro-m-toluenesulfonate salt of the α-d form of the base of claim 1.

4. The 4-chloro-m-toluenesulfonate salt of the α-l form of the base of claim 1.

5. The 3,4-dichlorobenzenesulfonate salts of the α-d and α-l forms of the base of claim 1.

6. The 3,4-dichlorobenzenesulfonate salt of the α-d form of the base of claim 1.

7. The 3,4-dichlorobenzenesulfonate salt of the α-l form of the base of claim 1.

* * * * *